United States Patent
Yu et al.

(10) Patent No.: US 8,655,942 B2
(45) Date of Patent: Feb. 18, 2014

(54) METHOD AND SYSTEM FOR SYNCHRONIZING DATA BETWEEN QUALCOMM PLATFORM TERMINAL AND PC SIDE

(75) Inventors: Jianfei Yu, Shenzhen (CN); Xin Zhou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/574,742
(22) PCT Filed: Oct. 12, 2010
(86) PCT No.: PCT/CN2010/077671
§ 371 (c)(1),
(2), (4) Date: Jul. 23, 2012
(87) PCT Pub. No.: WO2012/009885
PCT Pub. Date: Jan. 26, 2012

(65) Prior Publication Data
US 2012/0296956 A1 Nov. 22, 2012

(30) Foreign Application Priority Data
Jul. 22, 2010 (CN) .......................... 2010 1 0236709

(51) Int. Cl.
*G06F 15/16* (2006.01)
(52) U.S. Cl.
USPC ............ 709/202; 709/206; 709/218; 709/219
(58) Field of Classification Search
USPC ......... 709/203, 204, 205, 206, 217, 219, 224, 709/246, 247
See application file for complete search history.

(56) References Cited

U.S. PATENT DOCUMENTS

| | | | |
|---|---|---|---|
| 8,396,055 B2 * | 3/2013 | Patel et al. ..................... | 370/352 |
| 2003/0212759 A1 * | 11/2003 | Wu ................................ | 709/218 |

(Continued)

FOREIGN PATENT DOCUMENTS

| | | |
|---|---|---|
| CN | 1909705 A | 2/2007 |
| CN | 1967429 A | 5/2007 |
| CN | 101047924 A | 10/2007 |

OTHER PUBLICATIONS

International Search Report in international application No. PCT/CN2010/077671, mailed on Apr. 21, 2011.

(Continued)

*Primary Examiner* — Barbara Burgess
(74) *Attorney, Agent, or Firm* — Oppedahl Patent Law Firm LLC

(57) ABSTRACT

The present disclosure discloses a method for synchronizing data between a Qualcomm platform terminal and a Personal Computer (PC) side, which comprises the following steps: the DIAG module of the Qualcomm platform terminal receives a request packet from the PC side, converts the request packet into a pseudo request packet, and transmits the pseudo request packet to an application layer module of the Qualcomm platform terminal via an Original Equipment Manufacturer (OEM) layer module of the Qualcomm platform terminal; the application layer module fills a pseudo response packet according to the pseudo request packet transmitted from the OEM layer module and then transmits the pseudo response packet to the DIAG module via the OEM layer module; and the DIAG module converts the pseudo response packet transmitted from the OEM layer module into a real response packet and then transmits the real response packet to the PC side. The present disclosure also discloses a system for synchronizing data between a Qualcomm platform terminal and a PC side. In the present disclosure, the implementations of a bottom layer and an application layer are not mixed together any more, which reduces code coupling degree, avoids the occurrence of a fault in a data synchronization process and facilitate the extension of new functions.

4 Claims, 3 Drawing Sheets

(56) References Cited

U.S. PATENT DOCUMENTS

2004/0047471 A1* 3/2004 Sawano ............... 380/250
2004/0121789 A1* 6/2004 Lindsey ............... 455/517
2010/0005155 A1* 1/2010 Jain et al. ............ 709/219
2010/0268782 A1* 10/2010 Zombek et al. ....... 709/206
2011/0090898 A1* 4/2011 Patel et al. ........... 370/352

OTHER PUBLICATIONS

English Translation of the Written Opinion of the International Search Authority in international application No. PCT/CN2010/077671, mailed on Apr. 21, 2011.

* cited by examiner

METHOD AND SYSTEM FOR SYNCHRONIZING DATA BETWEEN QUALCOMM PLATFORM TERMINAL AND PC SIDE

TECHNICAL FIELD

The present disclosure relates to the field of Qualcomm platform terminals, and more particularly to a method and system for synchronizing data between a Qualcomm platform terminal and a PC side.

BACKGROUND

In a piece of software based on Qualcomm's Binary Runtime Environment for Wireless (Brew), the data diagnosis service module (DIAG module) of a Qualcomm platform provides systemic test and debugging functions for an external device and a data collection function for each module inside a system to mainly achieve a command interaction between pieces of Dual Mode Subscriber Software (DMSS)/Advanced mobile station software (AMSS) and to provide diagnosis data to be run on the DMSS/AMSS.

The handset synchronization software of a Qualcomm platform has to use an Encrypting File System (EFS) to implement the copying, deleting, moving or other management operations of a handset file system.

In a secondary callback technology based on Brew, the application layer of a piece of data synchronization software calls a callback initiate function (CALLBACK_Init) in a NEW function to register the callback of the APP in an Original Equipment Manufacturer (OEM) layer module, and the OEM layer module registers the callback of the OEM layer module in a Diag task via the registration function of Diag and then activates the callback directly using the callback queue activation function (ISHELL_Resume( )) of Brew or through the implicit call ISHELL_Resume( ) of another function, wherein the OEM layer module is an intermediate module of the data synchronization software that is located between the application layer and the service layer and responsible for data packet forwarding.

FIG. 1 is a schematic diagram showing the flow of a method for synchronizing data between a Qualcomm platform terminal and a PC side according to the prior art, as shown in FIG. 1, data synchronization between a Qualcomm platform terminal and a PC side in the prior art includes:

1) the PC side transmits a request packet to a DIAG module;
2) the DIAG module starts with a master task (diag_task) function, calls a signal processing (diag_process_sigs) function in the master task (diag_task) function to acquire a command from a queue request queue processing (diag_req_cmd_q) function, and calls a packet processing (diagpkt_process_request) function to process the command;
3) the DIAG module allocates the request packet to a corresponding sub-table according to the MASTER TABLE that is initially registered by Diag_Task, and then the sub-table maps the request packet to a corresponding function processing function (i.e. interface implementations of respective applications) according to the instruction (CMD) included in the head of the request packet or response packet processed in a corresponding DIAG module, and each field of the response packet is filled to generate the response packet;
4) command response data, which is generated after the command is processed, is submitted to a response packet queue processing function (diagpkt_rsp_q) queue by calling a diagpkt_commit function, a callback function (diag_tx_notify) is called to set a DIAG_TX_SIG semaphore, and the Diag Task is instructed to process the queue signals;
5) a rex system calls a signal waiting processing (diag_wait) function according to the semaphore DIAG_TX_SIG, determines the DIAG_TX_SIG semaphore in the diag_wait function, and in turn calls a packet content deliver (diagbuf_drain) function, a packet bonding processing (diagbuf_process_pkt_bnd) function and a response packet sending (diagpkt_rsp_send) function to transmit a response message packet;
6) the PC side receives the response message packet, and then a procedure of data transmission process is completed.

It can be seen that current synchronization software based on a Qualcomm platform is not perfect, particularly, the development mode is not that clear, and the implementations of a bottom layer and an application layer are mixed together. Thus, it is easy to cause a fault, the code coupling degree is extremely high, and it is inconvenient for the extension of new functions.

SUMMARY

In view of the above problem, the main object of the present disclosure is to provide a method and system for synchronizing data between a Qualcomm platform terminal and a PC side, so as to reduce code coupling degree, to avoid fault during the data synchronization process, and to facilitate the extension of new functions.

In order to achieve the purpose above, the technical scheme of the present disclosure is realized as follows:

A method for synchronizing data between a Qualcomm platform terminal and a PC side comprises the following steps that:

a DIAG module of the Qualcomm platform terminal receives a request packet from the PC side, converts the request packet into a pseudo request packet, and transmits the pseudo request packet to an application layer module of the Qualcomm platform terminal via an OEM layer module of the Qualcomm platform terminal;

the application layer module fills a pseudo response packet according to the pseudo request packet transmitted from the OEM layer module and then transmits the pseudo response packet to the DIAG module via the OEM layer module;

and the DIAG module converts the pseudo response packet transmitted from the OEM layer module into a real response packet and transmits the real response packet to the PC side.

The DIAG module interacts with the PC side via a serial port.

A system for synchronizing data between a Qualcomm platform terminal and a PC side includes a Qualcomm platform terminal and a PC side, wherein the Qualcomm platform terminal includes: a DIAG module, an OEM layer module and an application layer module, wherein the DIAG module is configured to receive a request packet from the PC side, convert the request packet into a pseudo request packet, transmit the pseudo request packet to the application layer module via the OEM layer module, and further configured to convert a pseudo response packet transmitted from the OEM layer module into a real response packet, and transmit the real response packet to the PC side; and the application layer module is configured to fill the pseudo response packet according to the pseudo request packet transmitted from the OEM layer module and then transmit the pseudo response packet to the DIAG module via the OEM layer module.

The DIAG module interacts with the PC side via a serial port.

In accordance with the method and system provided herein for synchronizing data between a Qualcomm platform terminal and a PC side, a Qualcomm platform terminal includes: an application layer module, an OEM layer module and a DIAG module; when implementing a data synchronization, the DIAG module de-packs a request packet transmitted from a PC side into a pseudo request packet via a serial port communication and sends the pseudo request packet to the application layer module to be processed via the OEM layer module, meanwhile, the pseudo response packet acquired by the OEM layer module from the application layer module is de-packed and recombined into a real response packet, which is then transmitted to the PC side via a serial port communication. The present disclosure realizes a data transmission between a Qualcomm platform handset and a PC side based on the Diag Service of a Qualcomm Brew UI Widget (Buiw) platform, a serial data transmission, an EFS as well as a Brew-based secondary callback technology. The development mode is clear and the implementations of a bottom layer and an application layer are not more mixed together, thus reducing the code coupling degree, avoiding the fault during a data synchronization process and facilitating the extension of new functions.

DETAILED DESCRIPTION

The basic idea of the present disclosure lies in that: a Qualcomm platform terminal includes: an application layer module, an OEM layer module and a DIAG module; when implementing data synchronization, the DIAG module de-packs a request packet transmitted from the PC side into a pseudo request packet via a serial port communication and sends the pseudo request packet to the application layer module via the OEM layer module, meanwhile, a pseudo response packet acquired by the OEM layer module from the application layer module is de-packed into a real response packet, which is then transmitted to the PC side via a serial port communication.

Figure 1:
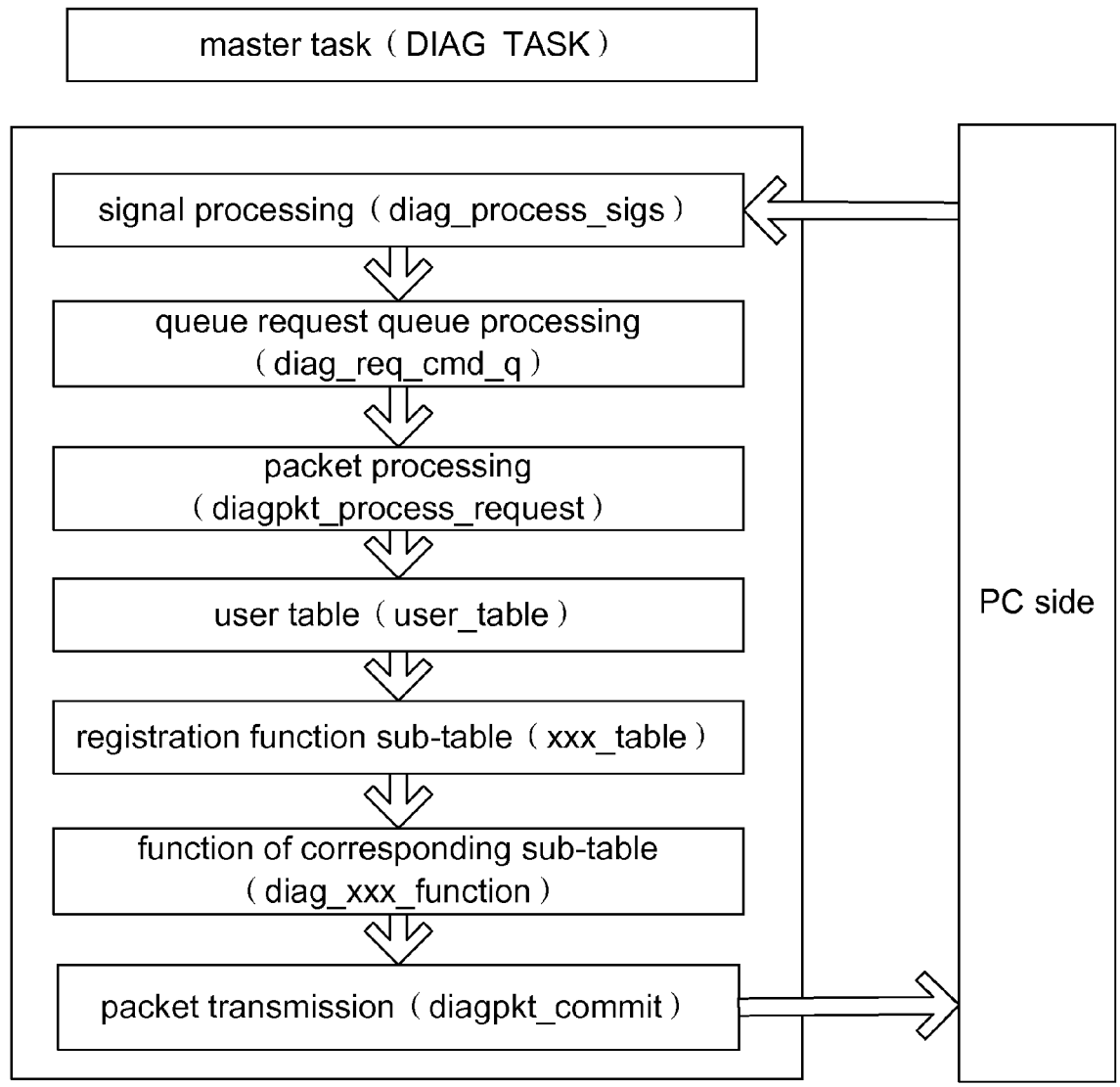
FIG. 1 is a schematic diagram showing the flow of a method for synchronizing data between a Qualcomm platform terminal and a PC side according to the conventional art.
Figure 2:
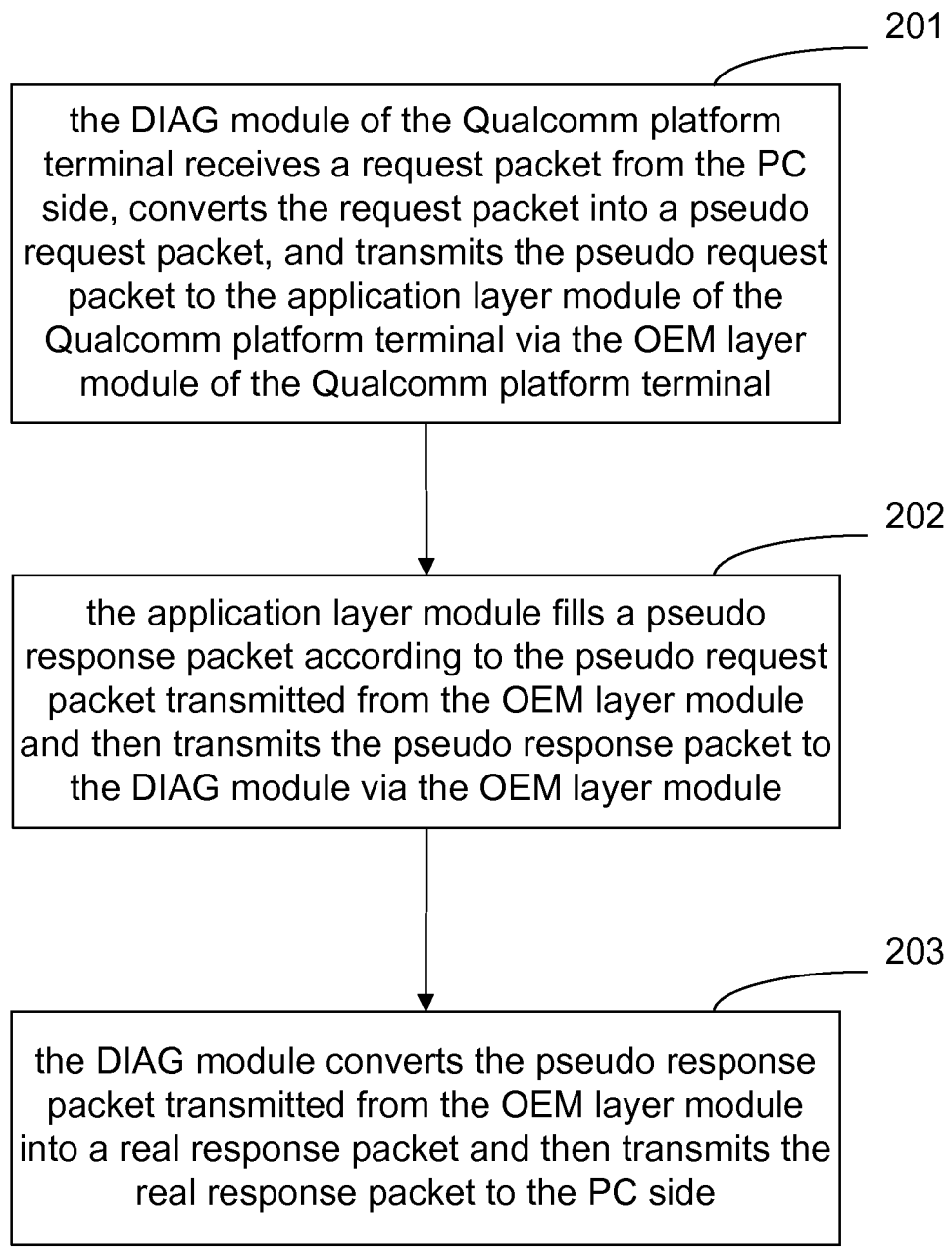
FIG. 2 is a schematic diagram showing the flow of a method for synchronizing data between a Qualcomm platform terminal and a PC side according to the present disclosure.

FIG. 2 is a schematic diagram showing the flow of a method for synchronizing data between a Qualcomm platform terminal and a PC side according to this present disclosure, as shown in FIG. 2, the method includes:

Step 201: the DIAG module of the Qualcomm platform terminal receives a request packet from the PC side, converts the request packet into a pseudo request packet, and transmits the pseudo request packet to the application layer module of the Qualcomm platform terminal via the OEM layer module of the Qualcomm platform terminal.

Specifically, the DIAG module de-packs the request packet transmitted from the PC side into a pseudo request packet via a serial port communication and then sends the pseudo request packet to the application module to be processed via the OEM layer module.

Step 202: the application layer module fills a pseudo response packet according to the pseudo request packet transmitted from the OEM layer module and then transmits the pseudo response packet to the DIAG module via the OEM layer module.

The OEM layer module is responsible for forwarding the pseudo request packet transmitted from the DIAG module to the application layer module and at the same time transmitting the pseudo response packet generated by the application layer module to the DIAG module.

Step 203: the DIAG module converts the pseudo response packet transmitted from the OEM layer module into a real response packet and then transmits the real response packet to the PC side.

Here, the DIAG module de-packs and recombines the pseudo response packet acquired from the OEM layer module into a real response packet and then transmits the real response packet to the PC side via a serial port transmission.

Figure 3:
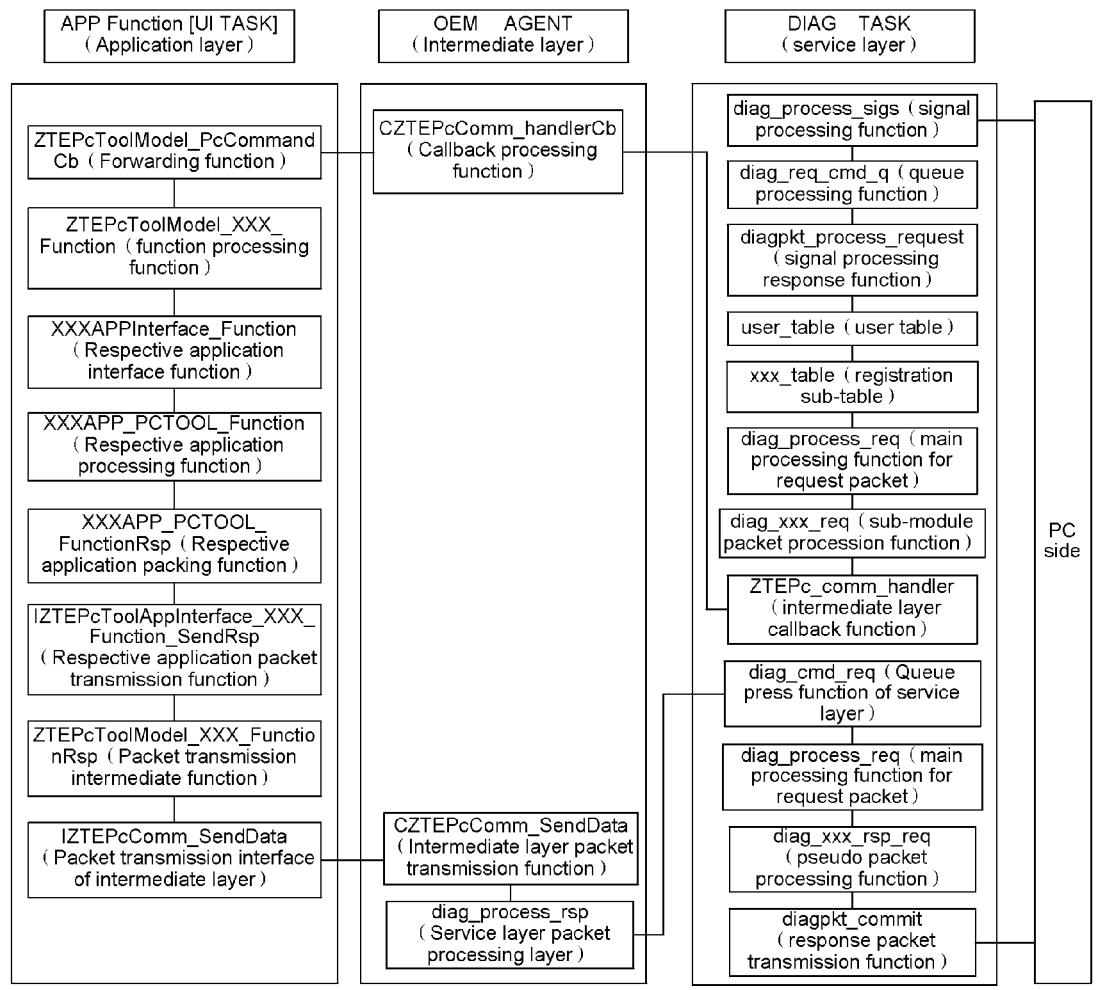
FIG. 3 is a schematic diagram showing the specific flow of data synchronization between a Qualcomm platform terminal and a PC side according to an embodiment of the present disclosure.

FIG. 3 is a schematic diagram showing the detailed flow of a method for synchronizing data between a Qualcomm platform terminal and a PC side according to an embodiment of the present disclosure, as shown in FIG. 3, the data synchronization between a Qualcomm platform terminal and a PC side described in this embodiment includes:

a, the PC side transmits a request packet to a DIAG module;

b, the DIAG module starts execution operations from a diag_task function, calls a diag_process_sigs function in the diag_task function to acquire a command from a diag_req_cmd_q queue, calls a diagpkt_process_request function to process the command, registers the callback processing function (CZTEPcComm_handlerCb) of the application layer to the DIAG module using a Brew-based secondary callback technology and a ZTEPcToolModel_PcCommandCb in the OEM layer module when the OEM layer module and the application layer module are created;

c, the DIAG module allocates the request packet to a corresponding sub-table according to the MASTER TABLE that is initially registered by Diag_Task, and the sub-table maps the request packet to diag_process-req according to a corresponding CMD, and then the request packet is allocated to respective main processing interface (diag_app_req) function according to the de-packed command_code, and then the request packet is forwarded to the OEM layer module via the processing function (ZTEPc_comm_handler) provided to the DIAG module by the intermediate layer; the OEM layer module forwards the request packet to a UI via CZTEPcComm_handlerCb, the UI forwards the request packet to respective application function processing function using ZTEPcToolModel_PcCommandCb according to cmd_id; the application function processing function calls the response packet packing interface function provided by each application module to generate a pseudo response packet and then calls the sending interface provided by the whole data synchronization software (ZTEPCTOOL); and the sending interface calls the IZTEPcComm_SendData function of the OEM layer module to send the pseudo response packet;

d, the OEM layer module calls diag_process_rsp to press the pseudo response packet into a Diag queue, forwards the pseudo response packet to diag_xxx_rsp_req via diag_process_req to recombine the pseudo response packet into a response packet, then submits response data to a diagpkt_rsp_q queue via a diagpkt_commit function, and calls a diag_tx_notify function to set a DIAG_TX_SIG semaphore, and instructs the Diag Task to process the queue signals e, a rex system calls a diag_wait function according to the semaphore DIAG_TX_SIG, determines the DIAG_TX_SIG semaphore in the function, and in turn calls a diagbuf_drain function, a diagbuf_process_pkt_bnd function and a diag-pkt_rsp_send function to send a response message packet.

f, the PC side receives the response message packet, and then a procedure of the data transmission process is completed.

The present disclosure also provides a system for synchronizing data between a Qualcomm platform terminal and a PC side, which comprises a Qualcomm platform terminal and a PC side, wherein the Qualcomm platform terminal comprises: a DIAG module, an OEM layer module and an application layer module, wherein the DIAG module is configured to receive a request packet from the PC side, convert the request packet into a pseudo request packet, transmit the pseudo request packet to the application layer module via the OEM layer module, and further configured to convert the pseudo response packet transmitted from the OEM layer module into a real response packet, and transmit the real response packet to the PC side; and the application layer module is configured to fill the pseudo response packet according to the pseudo request packet transmitted from the OEM layer module and then transmit the pseudo response packet to the DIAG module via the OEM layer module.

The DIAG module interacts with the PC side via a serial port.

The present disclosure relates to the Diag service of a Qualcomm Buiw platform, a serial port data transmission and an EFS as well as a secondary callback technology based on Brew, and realizes the data transmission processing between a Qualcomm platform handset and a piece of PC side software; by adopting the technology disclosed herein, the architectural design of a piece of handset synchronization software can be standardized with a clear design hierarchy and reduced code coupling degree, and new functions and new modules can be extended conveniently. Therefore, the development efficiency is improved greatly.

The mentioned above is merely preferred embodiments of the present disclosure and is not used to limit the protection scope of the present disclosure.

What is claimed is:

1. A method for synchronizing data between a handset and a personal computer (PC) side, comprising:

receiving, by a data diagnosis service (DIAG) module of the handset, a request packet from the PC side, converting the request packet into a pseudo request packet, and transmitting the pseudo request packet to an application layer module of the handset via an Original Equipment Manufacturer (OEM) layer module of the handset;

filling, by the application layer module, a pseudo response packet according to the pseudo request packet transmitted from the OEM layer module, and then transmitting the pseudo response packet to the DIAG module via the OEM layer module; and converting, by the DIAG module, the pseudo response packet transmitted from the OEM layer module into a real response packet, and transmitting the real response packet to the PC side, wherein the handset is based on a Qualcomm platform, and wherein in a process of transmitting the pseudo request packet to an application layer module of the handset via the OEM layer module of the handset, the DIAG module transmits the pseudo request packet to the OEM layer module by calling an OEM layer callback function, and the OEM layer module receives and forwards the pseudo request packet to the application layer module by calling an application layer callback function.

2. The method according to claim 1, wherein the DIAG module interacts with the PC side via a serial port.

3. A system for synchronizing data between a handset and a personal computer (PC) side, comprising a handset and a PC side, wherein the handset is based on a Qualcomm platform and comprises: a DIAG module, an (Original Equipment Manufacturer) OEM layer module and an application layer module, wherein the DIAG module is configured to receive a request packet from the PC side, convert the request packet into a pseudo request packet, transmit the pseudo request packet to the application layer module via the OEM layer module, and further configured to convert a pseudo response packet transmitted from the OEM layer module into a real response packet, and transmit the real response packet to the PC side;

wherein the application layer module is configured to fill the pseudo response packet according to the pseudo request packet transmitted from the OEM layer module, and then transmit the pseudo response packet to the DIAG module via the OEM layer module; and wherein in a process of transmitting the pseudo request packet to an application layer module of the handset via the OEM layer module of the handset, the DIAG module transmits the pseudo request packet to the OEM layer module by calling an OEM layer callback function, and the OEM layer module receives and forwards the pseudo request packet to the application layer module by calling an application layer callback function.

4. The system according to claim 3, wherein the DIAG module interacts with the PC side via a serial port.

* * * * *